United States Patent [19]
Prazak

[11] 3,741,571
[45] June 26, 1973

[54] EXPANDING MANDREL
[75] Inventor: Wayne A. Prazak, Lincoln, Nebr.
[73] Assignee: The Goodyear Tire & Rubber Company, Akron, Ohio
[22] Filed: Sept. 15, 1971
[21] Appl. No.: 180,671

Related U.S. Application Data
[63] Continuation-in-part of Ser. No. 86,019, Nov. 2, 1970, abandoned.

[52] U.S. Cl. .................. 279/2, 279/1 Q, 242/72 B, 82/44
[51] Int. Cl. ............................................. B23b 31/40
[58] Field of Search ............................. 279/1 Q, 2; 269/48.1; 242/72 B; 82/44

[56] References Cited
UNITED STATES PATENTS
3,414,210  12/1968  Gaudin .............................. 242/72 B Primary Examiner—Francis S. Husar
Attorney—F. W. Brunner and Michael L. Gill

[57] ABSTRACT

An expandable mandrel for use in manufacturing V belts, said mandrel having an inflatable expandable diaphragm, rigid axially extending segments disposed about the diaphragm, stop means surrounding the segments to limit the radially outer movement of the segments, coil springs disposed about the segments to contract the mandrel, and caps mounted on the radially outer sides of the segments to collectively provide a cylindrical surface.

The foregoing abstract is not to be taken as limiting the invention of this application, and in order to understand the full nature and extent of the technical disclosure of this application, reference must be made to the accompanying drawings and the following detailed description.

9 Claims, 5 Drawing Figures

EXPANDING MANDREL

This application is a continuation-in-part of my copending application Ser. No. 86,019, filed Nov. 2, 1970, and entitled Expanding Mandrel, now abandoned.

This invention relates to expandable mandrels and in particular to expandable mandrels for use in the manufacture of V belts.

In one method of manufacturing V belts a cylindrical sleeve is made of uncured rubber reinforced with fabric. This sleeve is then cured in a cylindrical shape. Subsequent to curing, peripheral cuts are made in the sleeve to sever it into a plurality of V belts. This invention pertains to a mandrel or form on which the sleeve is mounted in order that it may be cut into a plurality of V belts. The mandrel or form must be capable of expanding radially in order to firmly hold the cylindrical sleeve. Further, the expanded shape of the mandrel must be a true cylinder. This is necessary since in the cutting operation the mandrel is rotated and a cutting means is brought into contact with the periphery of the sleeve mounted thereon. If the cylinder is not firm and true the cutting means will not cut a true V belt from the sleeve, but rather irregularities will occur at each point at which the mandrel is not a true cylinder.

It is an object of this invention to provide an expandable mandrel which has a firm, true cylindrical outer surface when expanded for use in the manufacture of V belts.

It is a further object of this invention to provide such an expandable mandrel for use in severing a cured cylindrical sleeve into a plurality of V belts.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
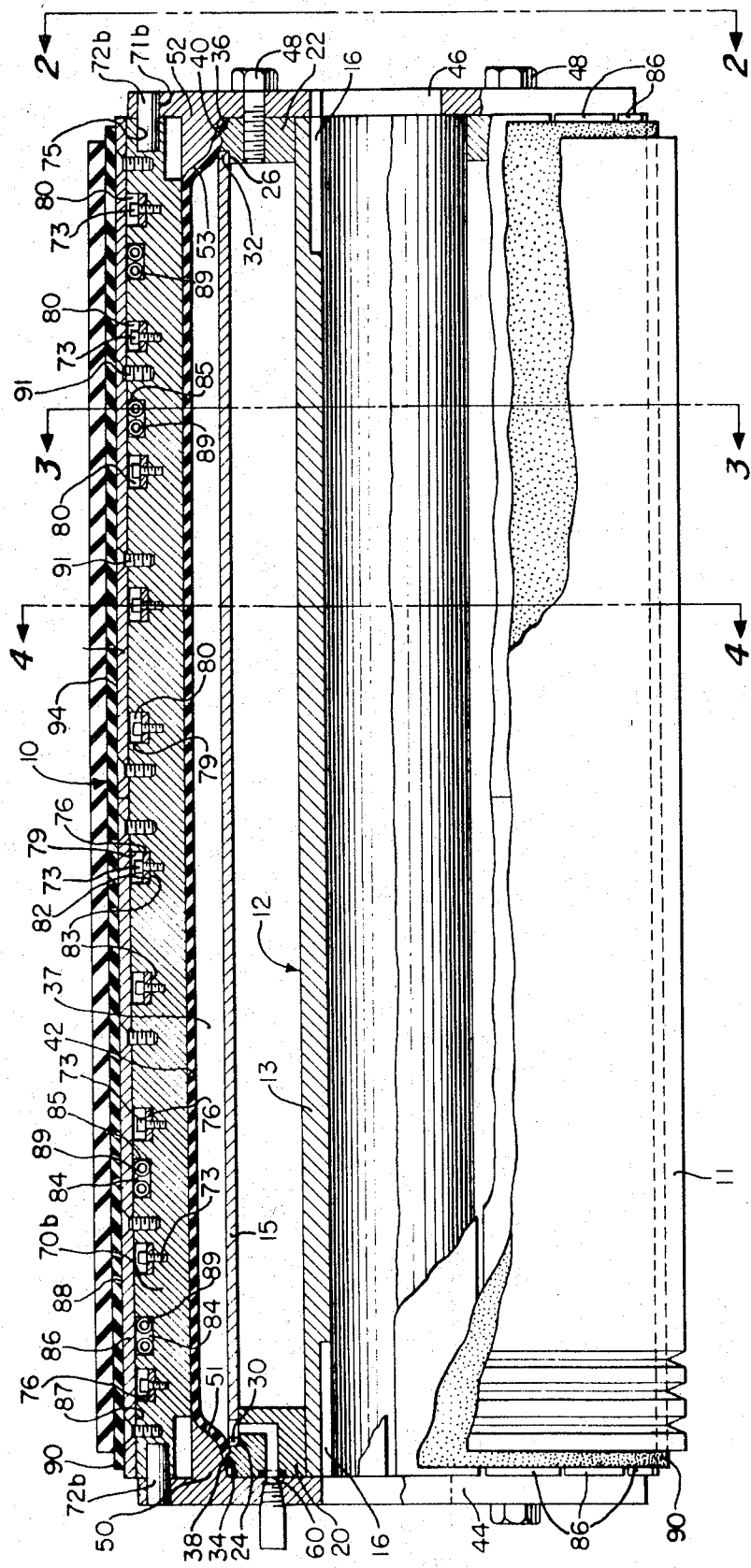
FIG. 1 is a side view of a mandrel constructed in accordance with this invention with portions broken away.
Figure 5:
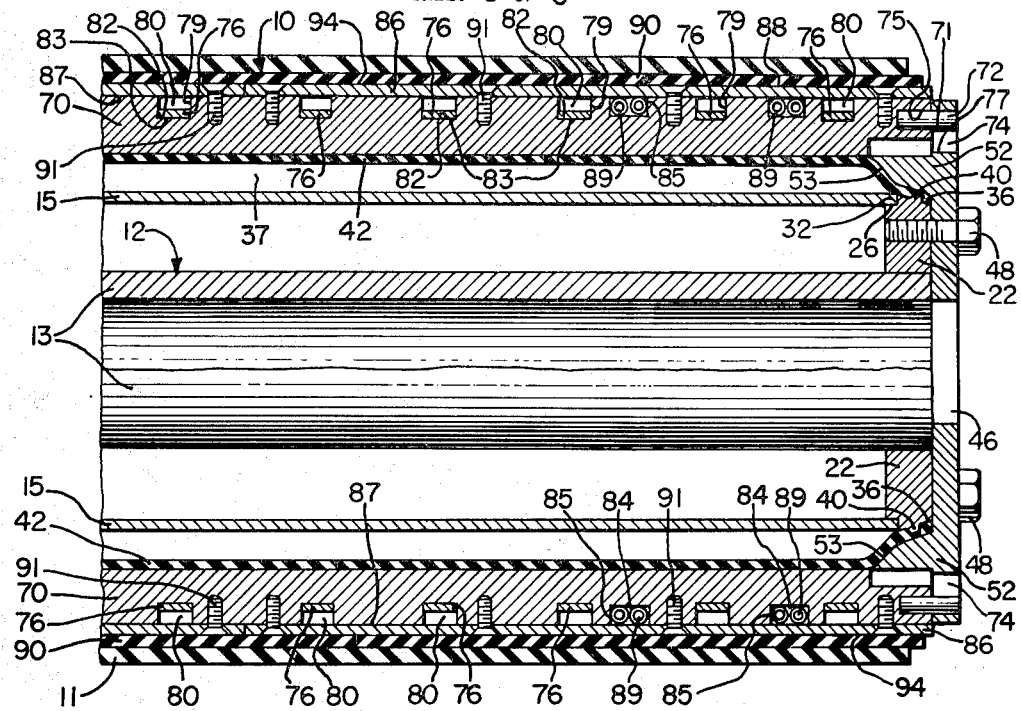
FIG. 5 is a partial cross-sectional view of the mandrel of FIG. 1 taken substantially along line 5—5 of FIG. 2.

With reference to the drawings and in particular FIGS. 1 and 5, a mandrel 10 constructed in accordance with this invention is illustrated in an expanded condition with a cured cylindrical sleeve 11 partially cut into V belts mounted thereon. A core 12 extends lengthwise of the mandrel 10 and comprises a central circular hollow tubular member 13, a cylindrical shell 15 disposed coaxially about the tubular member 13, and a pair of end caps 20 and 22 which rigidly fix the cylindrical shell 15 to the tubular member 13. The tubular member 13 is hollow in order to receive a shaft (not shown) on which the mandrel is to be mounted when in use. Keyways 16 are provided in both ends of the tubular member 13 in order that the mandrel 10 may be anchored to the shaft. The mandrel 10 when mounted on the shaft is rotated with the shaft whose rotational axis is coaxial with the axis of the core 12.

The generally circular end caps 20 and 22 are disposed about the outer ends of the tubular member 13 and rigidly mounted thereon. Both end caps 20 and 22 have the same outer diameter and each includes a shoulder 24, 26, respectively, disposed on the axially inner radially outer side thereof. The axial outer ends 30 and 32, respectively, of cylindrical shell 15 are mounted on the shoulders 24 and 26 to form an airtight seal with the end caps 20 and 22, respectively.

The radially outer surface 34, 36 of end caps 20, 22 is tapered toward the axially outer end and includes a raised annular rib 38, 40 extending circumferentially around tapered portions 34, 36, respectively. An expandable cylindrically shaped bladder or diaphragm 42 is disposed coaxially about cylindrical shell 15 on the core 12 with its axially outer ends engaging the tapered portions 34 and 36 to form an airtight seal therewith so as to form a thin cylindrical chamber 37 with the shell 15. The raised annular ribs 38, 40 assist in forming the seal with the diaphragm 42.

Generally disc shaped end plates 44 and 46 are fixed to the end caps 20 and 22, respectively, by means of bolts 48. Annular clamping rings 50, 52 extend axially inwardly from end plates 44 and 46, respectively, and have radially inner tapered surfaces 51, 53 which generally mate with tapered surfaces 34, 36, respectively, to clamp the axially outer ends of the diaphragm 42 therebetween. A passage 60 extends through the end plate 44, cap 20, and cylindrical shell 15 to communicate with the chamber 37 between the diaphragm 42 and cylindrical shell 15. Thus, the diaphragm or bladder 42 can be expanded radially by introducing pressurized fluid or air through the air passage 60 to the chamber 37.

Figure 2:
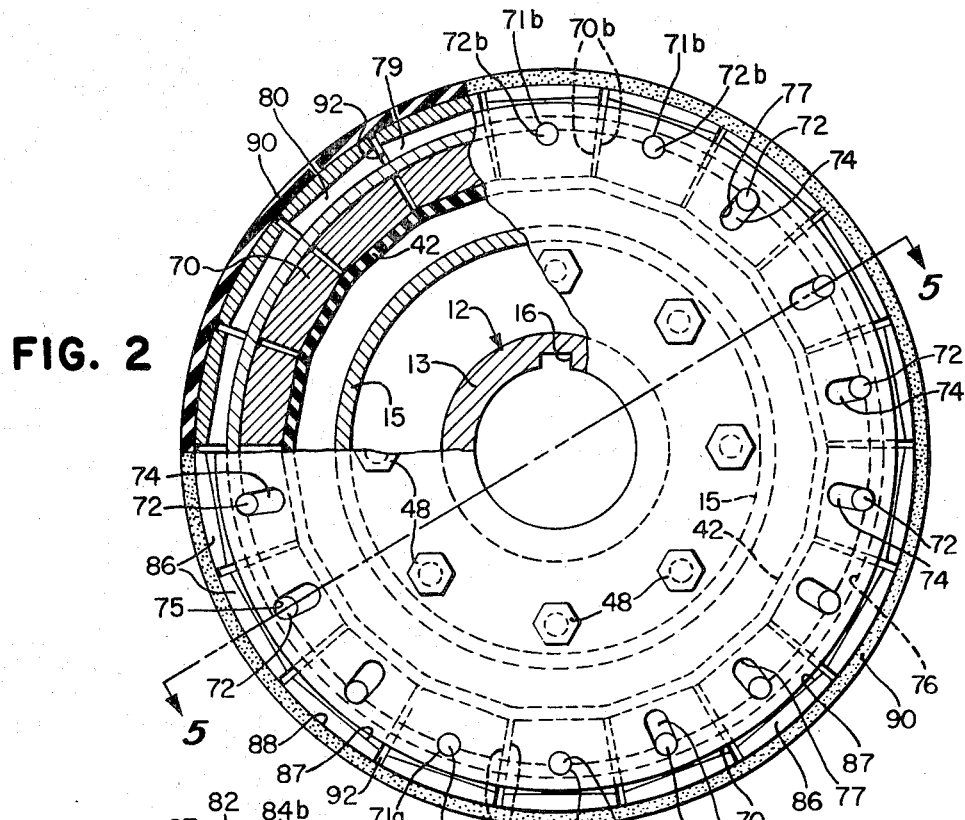
FIG. 2 is a view of the mandrel of FIG. 1 taken substantially along line 2—2 of FIG. 1 with portions broken away.
Figure 4:
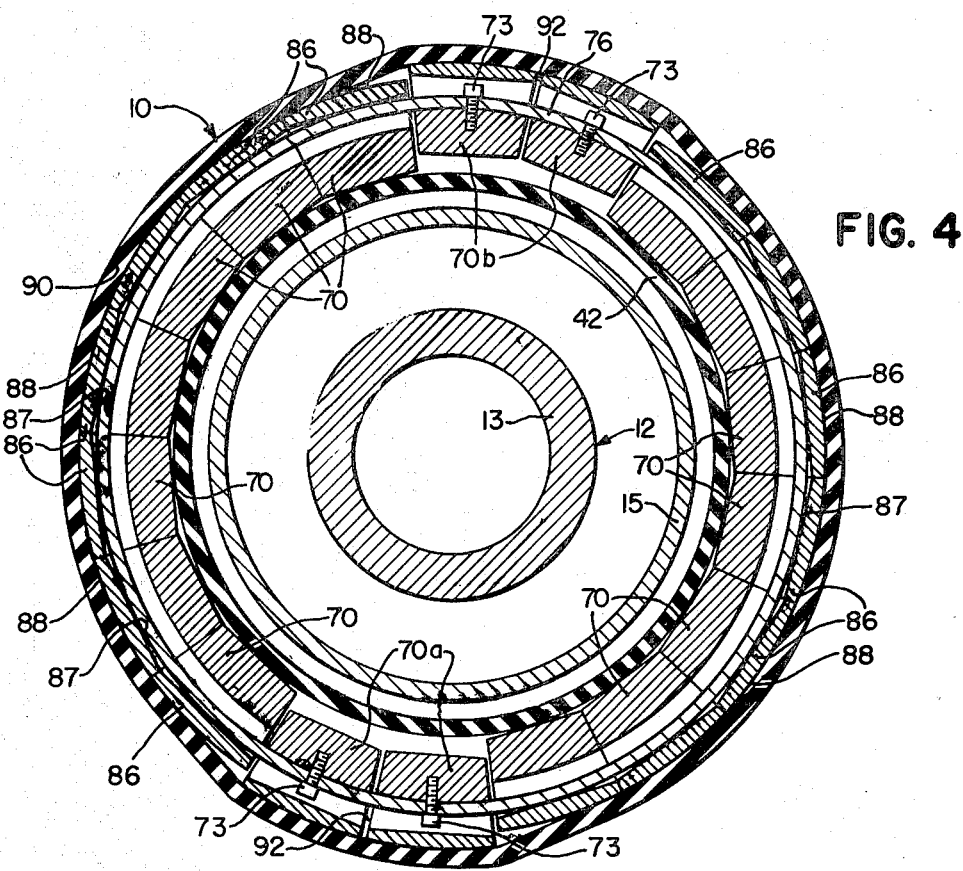
FIG. 4 is a sectional view of the mandrel of FIG. 1 taken substantially along line 4—4 of FIG. 1 and illustrated in a contracted configuration.

With reference to FIGS. 2, 4 and 5, a plurality of rigid elongated segments 70 are disposed circumferentially about the diaphragm 42 and extend the entire axial length thereof to form a generally cylindrical surface or drum. Each segment 70 is in the form of a truncated isosceles triangle when viewed in a plane perpendicular to the rotational axis of the mandrel. Each segment 70 is provided with a circular pin 72 extending in the axial direction from each end thereof. The axially outer extensions of each pin 72 extend into an elongated radially extending slot 74 in end plates 44 and 46.

Figure 3:
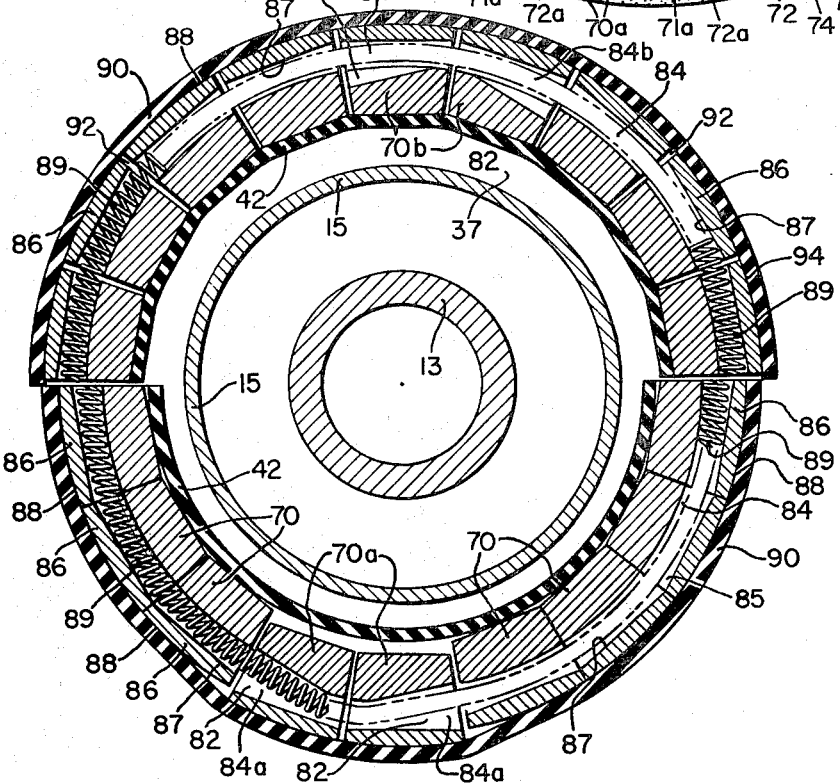
FIG. 3 is a view of the mandrel of FIG. 1 taken substantially along line 3—3 of FIG. 1 and illustrated with one-half in expanded condition and one-half in contracted condition.

As best seen in FIG. 2, the radially outer sides 75 of the slots 74 are equidistant from the rotational axis of the mandrel 10. Thus, it can be seen that the pins 72 abutting against the sides 75 results in all of the segments 70 being limited at their axially outer ends to the same distance from the rotational axis of the mandrel. This provides a fixed concentric stop means for the segments when the mandrel is in the expanded condition. Also, the radially inner sides 77 of the slots 74 are equidistant from the rotational axis of the mandrel 10 and thus provide a concentric stop means for the segments 70 in the radially inwardly direction. As best seen in FIG. 3, when the lugs 72 are against the inner stops or sides 77 there is a sufficient radial distance between the shell 15 and the segments such that the diaphragm 42 is not clamped therebetween.

As best seen in FIGS. 2 and 5, each segment 70 is provided with a first series of transversely extending sockets 79 in its radially outer surface. These sockets 79 are aligned circumferentially to form a series of peripheral recesses 80 in the outer surface of the segments 70 to receive stop means or rings 76. The peripheral recesses 80 and rings 76 are spaced along the axial extent of the segments 70 to prevent bowing of the segments 70 under the force of the inflated bladder 42. The radially inner surface or base 82 of each socket 79 is contoured to mate with the radially inner surface 83 of the respectively associated ring 76. Thus, when the segments 70 are forced against the rings 76, as illustrated in FIG. 2, the radially inner surface or base 82 of each socket 79 mates with a ring 76. This socket and ring arrangement fixes the angular orientation of each segment about an axis containing both of the pins 72. The relative depth of the peripheral recesses 80 and the inside diameter of the rings 76, and the radial position of the pins 72 on the segments 70 and the radially outer sides 75 of the slots 74 are such that all stop means are engaged at the same time to keep the radially outer side of each segment parallel to the axis of the mandrel when the mandrel is expanded.

With reference to FIGS. 1, 3 and 5, in order to retract the segments 70 and return the mandrel to its contracted state when the air is released from the chamber 37 a second series of sockets 84 are provided in the segments 70 and are aligned in circumferential directions to form a second series of peripheral recesses 85 along the axial length of the mandrel. A pair of circumferentially extending coiled springs 89 are disposed in each slot and are in engagement with the segments 70 to provide a resilient means for urging the segments 70 in a radially inwardly direction.

With reference to FIGS. 1 and 2 two pairs of segments 70a and 70b are located 180° apart on the mandrel and are fixed in a radially outermost position by virtue of their pins 72a and 72b, respectively, being received in holes 71a and 71b, respectively, rather than in radially extending slots 72. The segments 70a and 70b are the same size and shape as the rest of the segments 70. The stop means or rings 76 are fixed to the segments 70a and 70b by means of bolts 73. The rings 76 are thus fixed in a concentric position relative to the rotational axis of the mandrel.

When the mandrel is expanded the segments will abut against the concentric rings 76 and form a firm cylindrical surface that is concentric with the rotational axis of the mandrel. As seen in FIG. 4, when the mandrel is contracted the two pairs of segments 70a and 70b remain in their radially outer position while the rest of the segments 70 move radially inwardly.

A relatively thin elongated cap 86 is fixed to the radially outer surface of each segment by means of countersunk screws 91. The radially inner side 87 is flat to conform to the flat radially outer side of each segment 70. The radially outer side 88 of each cap 86, when viewed in planes perpendicular to the rotational axis of the mandrel, forms an arc of a circle having substantially the same radius as the expanded mandrel. These caps 86 serve to cover the sockets 84 and 79 and provide a smooth cylindrical surface 94 on the mandrel 10.

As best seen in FIG. 3, when the mandrel 10 is contracted there is preferably no clearance between the segments 70. When the mandrel 10 is expanded there is a small clearance 92 between the segments 70 but it is small enough to provide a substantially continuous firm cylindrical surface 94 to support the boot 90. As best seen in FIG. 3 the sockets 84a and 84b of the fixed segments 70a and 70b are enlarged in a radially inwardly direction at 82 to permit the coiled springs 89 to draw the rest of the segments 70 radially inwardly when the pressure is released from the bladder 42.

The mandrel when being used for severing a cured cylindrical sleeve into a plurality of V belts is provided with a cylindrically shaped resilient elastomeric or rubber boot 90 extending about the outer periphery. The boot 90 can be made the same diameter as or slightly smaller in diameter than the contracted diameter of the mandrel 10, forced on the mandrel 10 and left there for the entire workable life of the boot 90. A second method of providing the boot 90 would be to make the inside diameter of the boot slightly larger than the contracted diameter of the mandrel 10. The boot 90 is then folded to form an axially extending fold and inserted into the cylindrical sleeve 11 to be cut into V belts. The boot is then unfolded against the inner diameter of the sleeve 11. The composite of the boot 90 and sleeve 11 are then slid over the mandrel 10. The mandrel 10 is subsequently expanded to firmly hold the sleeve while it is being cut into a plurality of V belts. The mandrel 10 is then contracted and the boot and V belts drawn off. The boot 90 then can be folded and the V belts will drop free. The mandrel 10 can also be used for constructing the uncured cylindrical sleeve. In this case the boot 90 may or may not be utilized.

While certain representative embodiments and details have been shown for the purpose of illustrating the invention, it will be apparent to those skilled in this art that various changes and modifications may be made therein without departing from the spirit or scope of the invention.

What is claimed is:

1. An expandable mandrel comprising: a core having an axis about which said mandrel is to be rotated; an expandable cylindrical diaphragm disposed coaxially about and supported on said core; a plurality of axially extending segments mounted about the outer peripheral surface of said diaphragm for movement in radial directions with respect to said axis, the outer surfaces of the segments forming a generally cylindrical surface; means for fixing the angular position of said segments about said axis; stop means disposed in a plurality of positions along said segments and surrounding said segments for limiting radially outwardly movement of said segments; means for urging said segments in a radially inwardly direction; an elongated cap demountably fixed on the radially outer surface of each said segment and extending for substantially the entire length thereof; and means for introducing fluid under pressure to the radially inner side of said diaphragm to expand said diaphragm to move said segments radially outwardly.

2. A mandrel as claimed in claim 1, wherein said stop means includes a pair of end plates fixed to said core, said end plates having radially extending slots therein and each of said segments having a pin extending axially outwardly from each end thereof to protrude through one of said slots, said slots and pins providing said means to fix the angular position of said segments and to limit the radial movement of said segments.

3. A mandrel as claimed in claim 2, wherein a series of circumferentially aligned transverse sockets are formed in the radially outer surface of each said segment to provide a series of circumferentially extending recesses in said outer surface, and said stop means comprises a ring extending about said segments and disposed in each of said recesses.

4. A mandrel as claimed in claim 3, further including a second series of circumferentially aligned transverse sockets in the radially outer surface of each said segment to provide a second series of circumferentially extending recesses in said surfaces, and said means for urging said segments in a radially inward direction comprises at least one coil spring disposed in each recess of said second series of circumferentially extending recesses and extending about said segments.

5. A mandrel as claimed in claim 4, wherein the radially inner side of each said socket which receives a ring is contoured to mate with the radially inner surface of said ring to prevent angular rotation of each said segment about its long axis when said segment is urged against said ring.

6. A mandrel as claimed in claim 5, further including a cylindrical elastomeric boot disposed coaxially about said caps.

7. A mandrel as claimed in claim 3, wherein at least two segments located approximately 180° apart with respect to a direction about the rotational axis of the mandrel are fixed in their radially outer positions.

8. A mandrel as claimed in claim 7, wherein each said ring is fixed to the segments that are fixed in their radially outer positions.

9. A mandrel as claimed in claim 8, wherein a series of circumferentially aligned transverse sockets are formed in the radially outer surface of each said segment to provide a series of circumferentially extending recesses in said outer surface, and said stop means comprises a ring extending about said segments and disposed in each of said recesses.

* * * * *